(12) United States Patent
Sinks et al.

(10) Patent No.: US 12,506,777 B2
(45) Date of Patent: Dec. 23, 2025

(54) ANTI-PHISHING SECURITY

(71) Applicant: Bank of America Corporation, Charlotte, NC (US)

(72) Inventors: Steven Sinks, Scottsdale, AZ (US); Jonathan Sheedy, Poynton (GB)

(73) Assignee: Bank of America Corporation, Charlotte, NC (US)

( * ) Notice: Subject to any disclaimer, the term of this patent is extended or adjusted under 35 U.S.C. 154(b) by 257 days.

(21) Appl. No.: 18/136,711

(22) Filed: Apr. 19, 2023

(65) Prior Publication Data

US 2024/0356968 A1    Oct. 24, 2024

(51) Int. Cl.
*H04L 9/40* (2022.01)
*H04L 41/16* (2022.01)

(52) U.S. Cl.
CPC .......... *H04L 63/1483* (2013.01); *H04L 41/16* (2013.01)

(58) Field of Classification Search
CPC ............................ H04L 63/1483; H04L 41/16
See application file for complete search history.

(56) References Cited

U.S. PATENT DOCUMENTS

| | | | |
|---|---|---|---|
| 8,108,323 B2 | 1/2012 | Weinberger et al. | |
| 8,200,775 B2 | 6/2012 | Moore | |
| 8,370,362 B2 | 2/2013 | Szabo | |
| 8,719,339 B2 | 5/2014 | Reisman | |
| 8,924,488 B2 | 12/2014 | Bobotek | |
| 10,104,029 B1 | 10/2018 | Chambers et al. | |
| 10,264,018 B1 | 4/2019 | Sites | |
| 10,616,272 B2 | 4/2020 | Chambers et al. | |
| 10,944,789 B2 | 3/2021 | Correa Bahnsen et al. | |
| 11,431,747 B2 | 8/2022 | Irimie et al. | |
| 12,238,138 B2 * | 2/2025 | Zverkov | H04L 63/1483 |
| 2014/0359760 A1 * | 12/2014 | Gupta | H04L 63/1483 726/22 |
| 2017/0142048 A1 | 5/2017 | Tyagi et al. | |
| 2017/0318008 A1 | 11/2017 | Mead | |
| 2018/0248896 A1 | 8/2018 | Challita et al. | |
| 2019/0028509 A1 | 1/2019 | Cidon et al. | |
| 2019/0065742 A1 | 2/2019 | Humphries | |
| 2019/0068638 A1 * | 2/2019 | Bartik | H04L 63/1483 |

(Continued)

*Primary Examiner* — Nam T Tran
(74) *Attorney, Agent, or Firm* — Banner & Witcoff, Ltd.

(57) ABSTRACT

Artificial-intelligence ("AI") based anti-phishing information-security processes and machines are disclosed. An AI engine analyzes emails to extract domain, embedded images, and company names. The domain is accessed from different IP addresses, the content is captured from each and compared, and extracted images are compared to email images. Reverse DNS searches check whether the company owns the domain. Reverse image lookups determine whether the email image or version(s) thereof are detected previously on the domain. Natural language processing ("NLP") can compare the idiosyncrasies between the website content and the email text. Phishing-target characteristics that are common amongst recipients of the email can be determined. A phishing-risk score is computed based one or more of the image and content similarities, the reverse DNS, the reverse image lookup, the NLP similarity results, and/or common phishing-target characteristics. The score is compared to a risk threshold to determine how to handle the email.

20 Claims, 8 Drawing Sheets

(56) References Cited

U.S. PATENT DOCUMENTS

| | | |
|---|---|---|
| 2019/0098040 A1* | 3/2019 | Newman ............. H04L 63/1441 |
| 2019/0213498 A1 | 7/2019 | Adjaoute |
| 2020/0067976 A1 | 2/2020 | Jakobsson |
| 2021/0058395 A1 | 2/2021 | Jakobsson |
| 2021/0194924 A1 | 6/2021 | Heinemeyer et al. |
| 2021/0297442 A1 | 9/2021 | Vasseur et al. |
| 2022/0030029 A1* | 1/2022 | Kagan ................. H04L 63/1483 |
| 2022/0070216 A1* | 3/2022 | Kohavi ............... H04L 63/1483 |
| 2022/0210189 A1* | 6/2022 | Yu ....................... H04L 63/1483 |
| 2023/0231878 A1* | 7/2023 | Chechik ............. H04L 63/1483 |
| | | 726/23 |

* cited by examiner

Sample Phishing Email - 100

To: Recipient(s)@Target-Domain.com - 102

From: Sender@Originating-Domain.com - 104

Date: January 1, 2023 - 106

Subject: Check this out... - 108

Phishing Email Text  110

CLICK ME URL!!  112

First Image
114

Second Image
116

Company Logo
118

Company Name
Company Contact Information
120

ANTI-PHISHING SECURITY

TECHNICAL FIELD

The present disclosure relates to anti-phishing information security and, more particularly, to systems, methods, and apparatus for monitoring or scanning of emails and email content to protect against sophisticated phishing attacks targeting an organization or individual(s).

DESCRIPTION OF THE RELATED ART

Phishing is the fraudulent attempt to obtain sensitive information such as usernames, passwords, and credit card details by disguising oneself as a trustworthy entity in an electronic communication. Typically carried out by email spoofing, a phishing email directs users to enter personal information at a fake website which matches the look and feel of the legitimate site. This is often accomplished by the email purporting to be from trusted parties such as social websites, auction sites, online payment processors or IT administrators. As an example, a link provided in the email could named such that it appears to be from a trusted party; however, in reality, the link (e.g. malicious content) directs the user to the fake website where the user unsuspectingly provides their sensitive information.

Attempts to deal with phishing incidents include legislation, user training, public awareness, and technical security measures (the latter being due to phishing attacks frequently targeting weaknesses in current web security). However, such prior art attempts at protecting users from phishing emails are insufficient and often fail to provide the needed protection.

Oftentimes, when companies receive emails, checks are not performed on the domain (e.g., URL) from which the email is received. Internal security systems simply accept the email from whatever domain, assume that the email originated from that domain, and the email passes through whatever phishing and spam filtering system(s) the company has and is then forwarded to the user.

As a consequence, it is often easy to get emails past existing filters and then it is up to the user, who the unlawful actor is attempting to manipulate, to determine if the email is legitimate. This is a serious problem because the phishing email may contain logos, images, branding, text content, or the like that appears legitimate and is publicly available but may have actually been misappropriated from legitimate sites. It is especially problematic if the email appears to be originating from a person or entity that the user knows or is pertaining to a product or event in which the user was expecting a communication.

Sophisticated attacks specifically targeting a particular company can be even more problematic. An attacker can recognize that the target company has particular IP addresses or domains that have been registered. In order to prevent takedowns from owners of the images or content that has been misappropriated and/or prevent indexing of the illegitimate site by search engines, the attackers may have their phishing website present the phishing content if the site is being accessed from one of the target IP addresses or domains, and otherwise present an innocuous, unrelated, and/or decoy site for traffic from non-target IP addresses or domains (including search engines and web crawlers).

The disclosure addresses one or more of the shortcomings in the industry, thus protecting users from phishing emails containing malicious content.

SUMMARY OF THE INVENTION

In accordance with one or more arrangements of the non-limiting sample disclosures contained herein, solutions are provided to address one or more of the shortcomings in the field of information security by, inter alia: (a) detecting images or content in the body of a received email, (b) determining whether the images or content or the received emails themselves are unique to the particular recipient or has been detected in emails to other individuals in the company; (c) determining whether the images or content corresponds to what the company typically would say or do and/or is similar to the wording of other legitimate branding messages; (d) performing internal and/or external server reverse lookups on the images and content to see if they actually appear on the domain for the originating email; (e) determining whether the images or content in the email has anything to do with what is displayed on the domain identified in the email or is the content unrelated; (f) performing big data mining and/or using natural language processing ("NLP") to identify idiosyncrasies in branding messages or content for companies or in phishing emails originating from bad actors in particular regions (e.g., common misspellings of words in emails received from foreign regions or countries known for phishing emails); (g) identifying legitimate companies in the email, performing domain searches on the company name(s) to identify IP addresses for the legitimate domains and comparing the originating domain from the email to the IP address for the legitimate domains to see if there is a match or mismatch; (h) utilizing artificial intelligence ("AI") or machine learning ("ML") to assess the AI/ML probability that the email is legitimate based on one or more of the foregoing; (i) dynamically updating by the AI/ML engine probability assessments based on real-time or other interval monitoring of emails received by the company; (j) filtering emails and/or providing notifications when the probability assessment exceeds a risk threshold or falls within one or more risk scoring regions; and/or (k) delivering the emails (either with or without the AI/ML probability assessment) when the probability assessment does not exceed the risk threshold or falls within one or more safe or safer scoring regions.

Considering the foregoing, the following presents a simplified summary of the present disclosure to provide a basic understanding of various aspects of the disclosure. This summary is not limiting with respect to the exemplary aspects of the inventions described herein and is not an extensive overview of the disclosure. It is not intended to identify key or critical elements of or steps in the disclosure or to delineate the scope of the disclosure. Instead, as would be understood by a personal of ordinary skill in the art, the following summary merely presents some concepts of the disclosure in a simplified form as a prelude to the more detailed description provided below. Moreover, sufficient written descriptions of the inventions are disclosed in the specification throughout this application along with exemplary, non-exhaustive, and non-limiting manners and processes of making and using the inventions, in such full, clear, concise, and exact terms to enable skilled artisans to make and use the inventions without undue experimentation and sets forth the best mode contemplated for carrying out the inventions.

In accordance with one or more different arrangements and aspects of this disclosure, artificial-intelligence based anti-phishing information-security processes and machines are utilized. An AI engine can analyze emails received by individuals at an organization. Originating domain information, images embedded in the emails, company names referenced in the emails, and/or other information in the subject line, email bodies, and/or email metadata can be extracted and processed. The originating domain can be accessed from different IP addresses. One IP address could be from the domain targeted by the email. Another IP address could be from an unrelated domain that the phishing attacker may not know is owned by the target organization or a generic public IP address. Content can be captured from the originating domain when separately accessed from the different IP addresses, and then can be compared. Whether the content is different when accessed from different sites and/or the degree of similarity/dissimilarity can be computed and is relevant to whether the email is a potential phishing attack. Images may be extracted from the originating domain and compared to images extracted from the email. The similarity/dissimilarity of the email images and website images can be computed and determined. Again, whether the images are the same and/or the degree of similarity/dissimilarity can be computed and is relevant to whether the email is a potential phishing attack.

Further, reverse domain name searches ("DNS") can check whether the company referenced in the email actually owns the domain. Reverse image lookups can determine whether the email image or version(s) thereof were detected previously on the domain by search or indexing engines. These search results are relevant to whether the email is a potential phishing attack.

Additionally, natural language processing or the like can detect idiosyncrasies in the website content and/or the email text. The similarity/dissimilarity of any idiosyncrasies can be computed and the degree of such can be relevant to whether the email is a potential phishing attack.

Also, phishing-target characteristics that are common amongst multiple recipients of the same or similar emails can be determined. Any commonalities may be indicative of whether the email is a potential phishing attack.

A phishing-risk score can be computed based one or more of the image and content similarities, the reverse DNS, the reverse image lookup, the NLP similarity results, and/or common phishing-target characteristics. The score can be compared to a risk threshold to determine how to handle the email. Sample handling decisions may be whether to quarantine, block, filter, and/or deliver the email. Notifications, including the score and risk categories, can also be provided. The handling decision and other captured data may be stored and used to optimize or alter the AI or other processing or scoring. The historical information and newly captured information can be fed into the AI engine or the like as part of ongoing big data mining to learn from prior and current attacks in order further train the AI model to prevent future attacks. This feedback of the data results into the AI model allows it to continuously optimize itself and learn from prior historical information, if desired.

In some arrangements, anti-phishing information-security method(s) can perform one or more steps such as: analyzing, by an artificial intelligence engine, an email received from an external source; determining, by the AI engine, an originating domain for the email; detecting, in the email body by the AI engine, an embedded image; detecting, in the email body by the AI engine, a company name referenced in the email; accessing, by the AI engine from a first IP address, the originating domain; retrieving, by the AI engine from the originating domain, first content when accessed from the first IP address; accessing, from a second IP address, the originating domain by the AI engine; retrieving, by the AI engine from the originating domain, second content when accessed from the second IP address; determining, by the AI engine, a content similarity based on a content comparison of the first content to the second content; extracting, by the AI engine, website images from the originating domain; determining, by the AI engine, an image similarity based on an image comparison of the embedded image to the website images; executing, by the AI engine, a reverse domain name search to determine whether the originating domain is registered to the company; executing, by the AI engine, a reverse image lookup to determine whether the embedded image was previously detected as being located on the originating domain; calculating, by the AI engine, a phishing-risk score based on one or more of the content similarity, the image similarity, the reverse DNS, and the reverse image lookup; and/or comparing, by the AI engine, the phishing-risk score to a risk threshold to determine whether to block, quarantine, or deliver the email based on the phishing-risk score.

In some arrangements, anti-phishing information-security method(s) can perform one or more steps such as: analyzing, by an artificial intelligence engine, an email received from an external source; detecting, by the AI engine, that the email was sent to multiple individuals in an organization; comparing, by the AI engine, job information for each of said multiple recipients; detecting, by the AI engine, any commonalities in the job information; determining, by the AI engine, an originating domain for the email; detecting, in the email body by the AI engine, an embedded image and a company name referenced in the email; accessing, by the AI engine from a first IP address, the originating domain; retrieving, by the AI engine from the originating domain, first content when accessed from the first IP address; accessing, from a second IP address, the originating domain by the AI engine; retrieving, by the AI engine from the originating domain, second content when accessed from the second IP address; determining, by the AI engine, a content similarity based on a content comparison of the first content to the second content; extracting, by the AI engine, website images from the originating domain; determining, by the AI engine, an image similarity based on an image comparison of the embedded image to the website images; executing, by the AI engine, a reverse domain name search to determine whether the originating domain is registered to the company; executing, by the AI engine, a reverse image lookup to determine whether the embedded image was previously detected as being located on the originating domain; extracting, by the AI engine, email text from the email; natural language processing, by the AI engine, the email text to recognize email-language idiosyncrasies; retrieving, by the AI engine, website text from the originating domain; natural language processing, by the AI engine, the website text to recognize website-language idiosyncrasies; comparing, by the AI engine, the email-language idiosyncrasies with website-language idiosyncrasies to generate an idiosyncrasy comparison; calculating, by the AI engine, a phishing-risk score based on the content similarity, the image similarity, the reverse DNS, the reverse image lookup, the idiosyncrasy comparison, and the commonalities; and/or comparing, by the AI engine, the phishing-risk score to a risk threshold to determine whether to block, quarantine, or deliver the email based on the phishing-risk score.

In some arrangements, the AI engine may be internal within an organization's firewall or could be cloud based in either a private or public cloud.

In some arrangements, one or more various steps of processes disclosed herein can be implemented in whole or in part as computer-executable instructions stored on computer-readable media. Functionality and steps can be performed on a machine or distributed across a plurality of machines that are in communication with one another.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

In the following description of the various embodiments to accomplish the foregoing, reference is made to the accompanying drawings, which form a part hereof, and in which is shown by way of illustration, various embodiments in which the disclosure may be practiced. It is to be understood that other embodiments may be utilized, and structural and functional modifications may be made. It is noted that various connections between elements are discussed in the following description. It is noted that these connections are general and, unless specified otherwise, may be direct or indirect, wired, or wireless, and that the specification is not intended to be limiting in this respect.

As used throughout this disclosure, any number of computers, machines, or the like can include one or more general-purpose, customized, configured, special-purpose, virtual, physical, and/or network-accessible devices such as: administrative computers, application servers, clients, cloud devices, clusters, compliance watchers, computing devices, computing platforms, controlled computers, controlling computers, desktop computers, distributed systems, enterprise computers, instances, laptop devices, monitors or monitoring systems, nodes, notebook computers, personal computers, portable electronic devices, portals (internal or external), servers, smart devices, streaming servers, tablets, web servers, and/or workstations, which may have one or more application specific integrated circuits (ASICs), microprocessors, cores, executors etc. for executing, accessing, controlling, implementing etc. various software, computer-executable instructions, data, modules, processes, routines, or the like as discussed below.

References to computers, machines, or the like as in the examples above are used interchangeably in this specification and are not considered limiting or exclusive to any type(s) of electrical device(s), or component(s), or the like. Instead, references in this disclosure to computers, machines, or the like are to be interpreted broadly as understood by skilled artisans. Further, as used in this specification, computers, machines, or the like also include all hardware and components typically contained therein such as, for example, ASICs, processors, executors, cores, etc., display(s) and/or input interfaces/devices, network interfaces, communication buses, or the like, and memories or the like, which can include various sectors, locations, structures, or other electrical elements or components, software, computer-executable instructions, data, modules, processes, routines etc. Other specific or general components, machines, or the like are not depicted in the interest of brevity and would be understood readily by a person of skill in the art.

As used throughout this disclosure, software, computer-executable instructions, data, modules, processes, routines, or the like can include one or more: active-learning, algorithms, alarms, alerts, applications, application program interfaces (APIs), artificial intelligence, approvals, asymmetric encryption (including public/private keys), attachments, big data, CRON functionality, daemons, databases, datasets, datastores, drivers, data structures, emails, extraction functionality, file systems or distributed file systems, firmware, governance rules, graphical user interfaces (GUI or UI), images, instructions, interactions, Java jar files, Java Virtual Machines (JVMs), juggler schedulers and supervisors, load balancers, load functionality, machine learning (supervised, semi-supervised, unsupervised, or natural language processing), middleware, modules, namespaces, objects, operating systems, platforms, processes, protocols, programs, rejections, routes, routines, security, scripts, tables, tools, transactions, transformation functionality, user actions, user interface codes, utilities, web application firewalls (WAFs), web servers, websites, etc.

The foregoing software, computer-executable instructions, data, modules, processes, routines, or the like can be on tangible computer-readable memory (local, in network-attached storage, be directly and/or indirectly accessible by network, removable, remote, cloud-based, cloud-accessible, etc.), can be stored in volatile or non-volatile memory, and can operate autonomously, on-demand, on a schedule, spontaneously, proactively, and/or reactively, and can be stored together or distributed across computers, machines, or the like including memory and other components thereof. Some or all the foregoing may additionally and/or alternatively be stored similarly and/or in a distributed manner in the network accessible storage/distributed data/datastores/databases/big data etc.

As used throughout this disclosure, computer "networks," topologies, or the like can include one or more local area networks (LANs), wide area networks (WANs), the Internet, clouds, wired networks, wireless networks, digital subscriber line (DSL) networks, frame relay networks, asynchronous transfer mode (ATM) networks, virtual private networks (VPN), or any direct or indirect combinations of the same. They may also have separate interfaces for internal network communications, external network communications, and management communications. Virtual IP addresses (VIPs) may be coupled to each if desired. Networks also include associated equipment and components such as access points, adapters, buses, ethernet adaptors (physical and wireless), firewalls, hubs, modems, routers, and/or switches located inside the network, on its periphery, and/or elsewhere, and software, computer-executable instructions, data, modules, processes, routines, or the like executing on the foregoing. Network(s) may utilize any transport that supports HTTPS or any other type of suitable communication, transmission, and/or other packet-based protocol.

Figure 1:
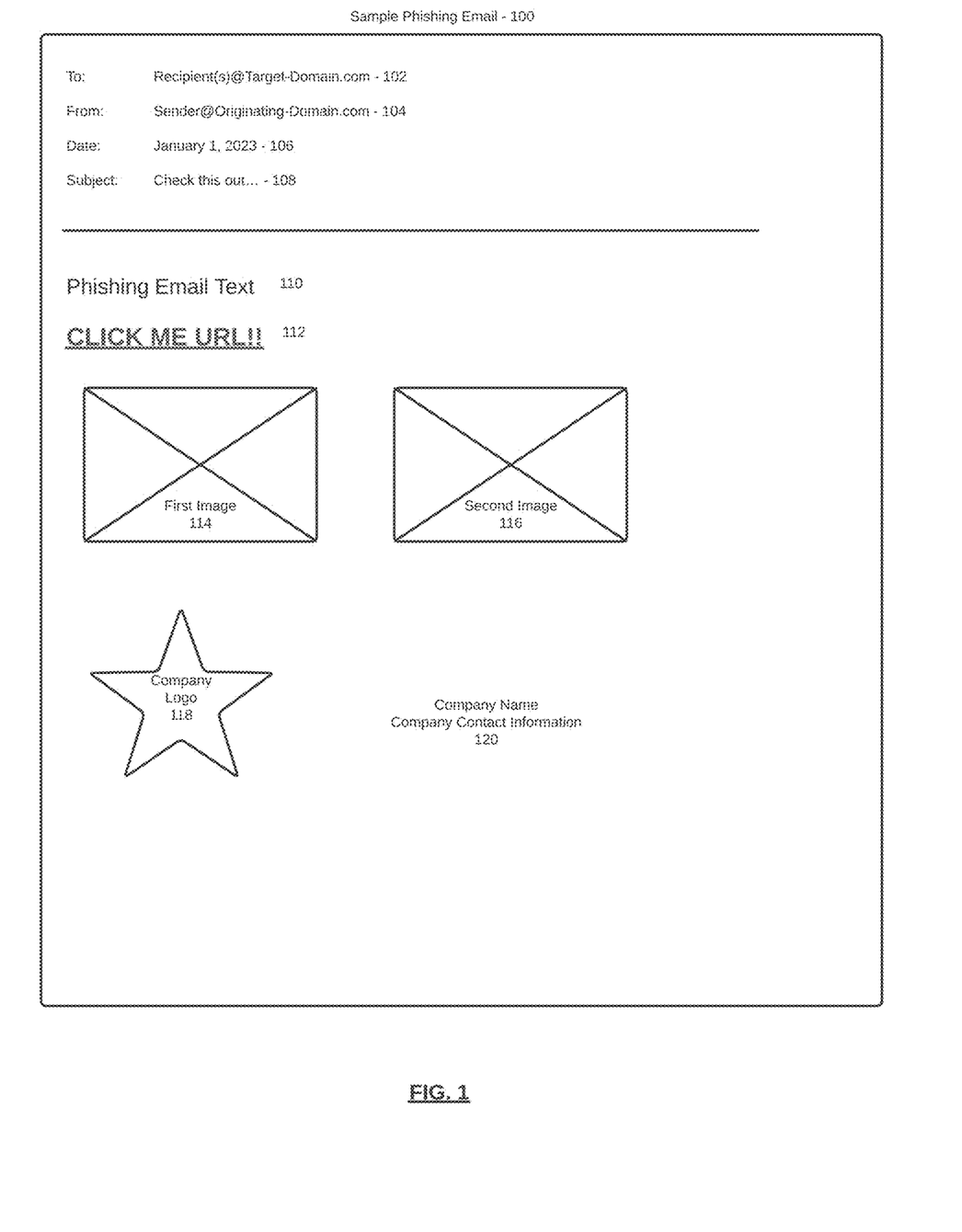
FIG. 1 depicts a sample phishing email that can be detected and processed in accordance with one or more anti-phishing information-security aspects of this disclosure.

By way of non-limiting disclosure, FIG. 1 depicts a sample phishing email 100 that can be detected and processed in accordance with one or more anti-phishing information-security aspects of this disclosure. From an attacker's standpoint, the email 100 would have standard fields such as a "To" field 102, a "From" field 104, a "Date" field 106, and a "Subject" field 108. The "From" field 104 may or may not correctly identify the originating domain from which the email was sent. If not correctly identified in the "From" field 104, the information could be discerned from the email 100 metadata (not shown.)

The email 100 would also have some deceptive or compelling phishing-email text 110 with one or more links 112, which the attacker is trying to trick the recipient into clicking. In order to facilitate the deception, one or more various images 114 and 116 may appear in the email in order to give the illusion that the email is legitimate and is originating from a particular company. To enhance the likelihood of tricking the recipient, the company logo 118 may be included in the email body along with the company name, company contact information, etc. 120. Based on the foregoing and potential additional information in the email 100, it will appear to the targeted recipient(s) in the target domain as legitimate and potentially deceive the recipient(s) into clicking on the malicious URL 112.

Figure 2A:
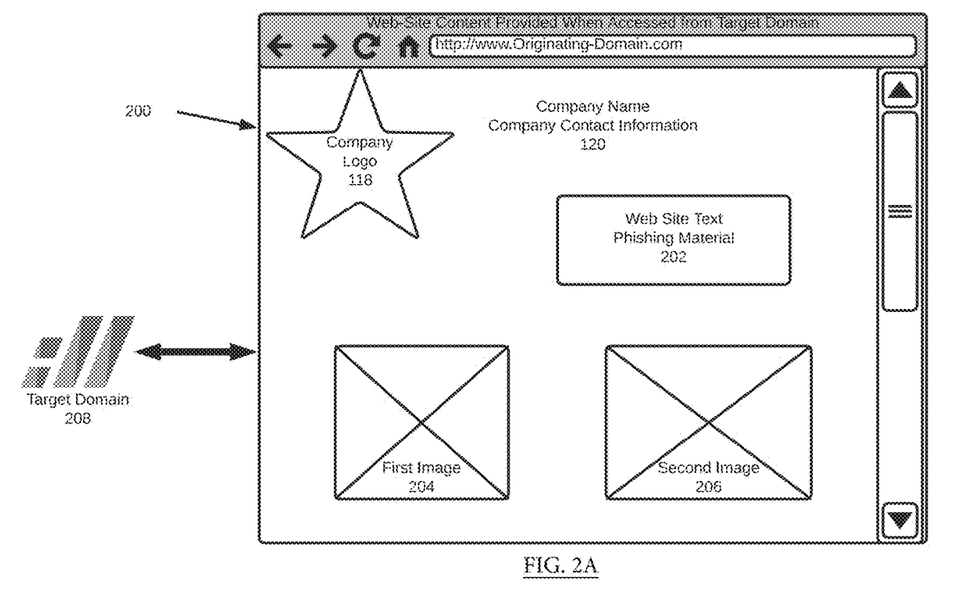
FIG. 2A depicts the result of accessing an originating domain that was referenced in a phishing email, wherein the access is being performed from the target domain.

By way of non-limiting disclosure, FIG. 2A depicts the result of accessing an originating domain that was referenced in a phishing email, wherein the access is being performed from the target domain. This helps illustrate the problems associated with addressing this type of threat.

When the originating domain (or whatever phishing domain is used) is accessed from the targeted domain 208 (including targeted companies, targeted users, target IP addresses, targeted systems, etc.), a webpage 200 with the phishing content is displayed. This would include the same or similar company logo 118 (for trademark or branding purposes) and company name/company contact information 120 etc. It would also include the website text/phishing material 202. This could include malicious information, links, or whatever else the attacker is trying to accomplish or facilitate. In order to add to the illusion, the same image(s) (e.g., first image 204, second image 206, etc.) or similar versions thereof (e.g., potentially scaled, cropped, adjusted, and/otherwise modified, etc.) can be included that correspond, for consistency purposes, to the images 114, 116 in the phishing email 100 as shown in FIG. 1. This is what would be visible when the website is accessed from the target domain or the like.

Figure 2B:
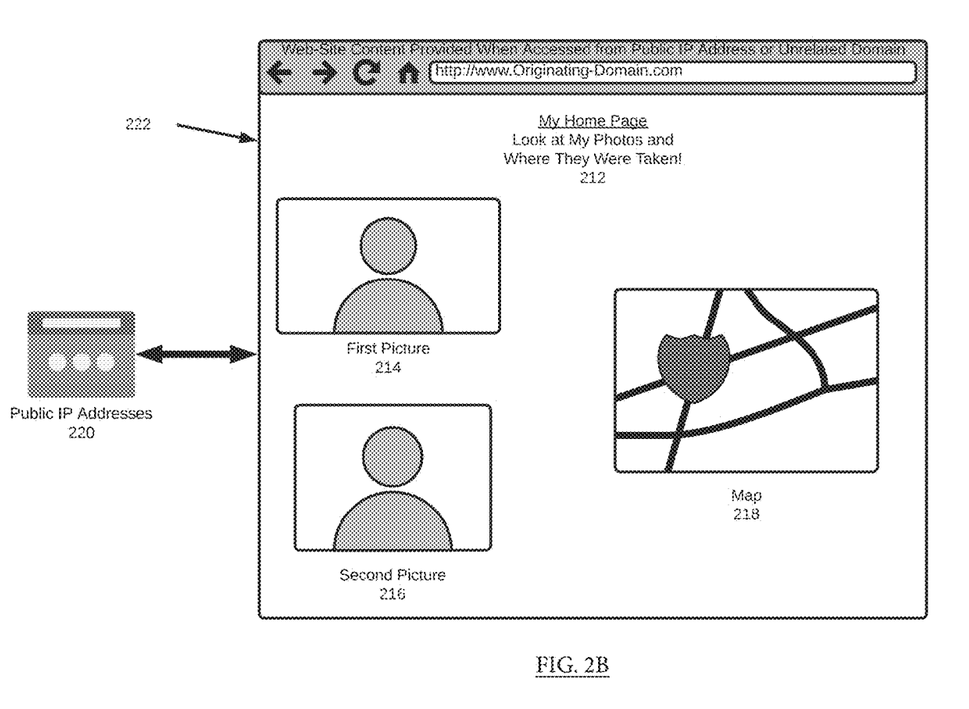
FIG. 2B depicts the result of accessing an originating domain that was referenced in a phishing email, wherein the access is being performed from a public IP address or other domain outside the scope of what was targeted.

Conversely, by way of non-limiting disclosure, FIG. 2B depicts the result of accessing an originating domain that was referenced in a phishing email, wherein the access is being performed from a public IP address or other domain outside the scope of what was targeted.

When the originating domain (or whatever phishing domain is used) is accessed from public IP address(es) 220 or a domain other the targeted domain 208, a decoy webpage 222 without the phishing content is displayed. In particular, nothing from the phishing webpage is depicted. Generic content such as, for example, from a person's own webpage 212 with photos 214, 216 and perhaps a map 218 of where the photos were taken can be shown. This has nothing to do with anything on the phishing site. Whether the phishing site 200 or the generic decoy site 222 would be presented to the computer accessing the originating domain would depend on the IP address or domain from which the access request is sent. A completely different page being presented depending on whether accessed from the targeted domain or a public IP address would be indicative of a potential phish risk.

Figure 3A:
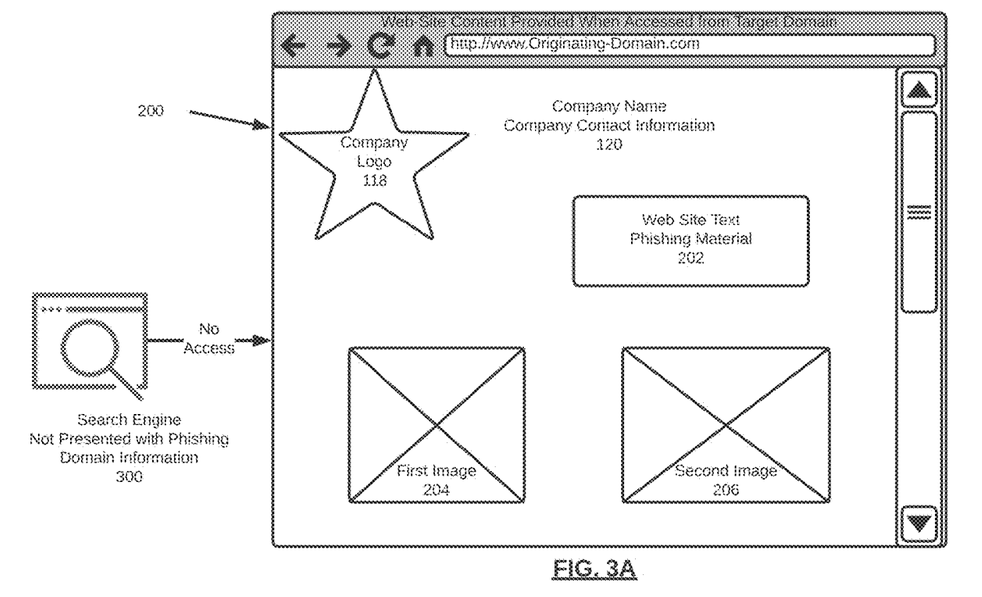
FIGS. 3A and 3B contrast the access results that a search engine will receive depending on the IP address or domain from which the search engine is accessing the originating domain referenced in the phishing email.
Figure 3B:
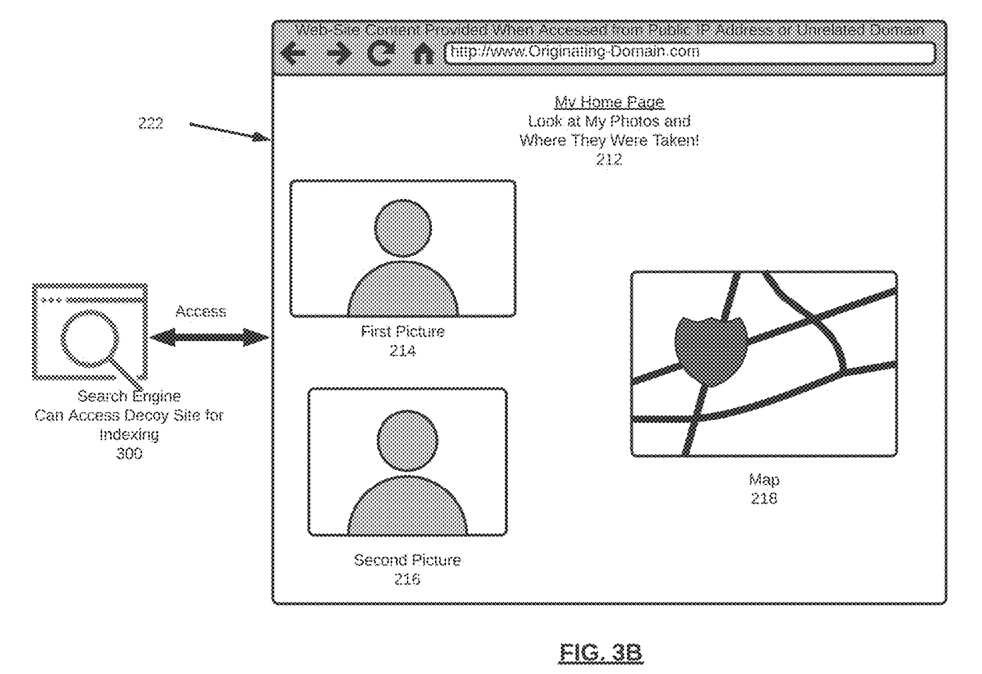

The ramifications of the foregoing can be seen in FIGS. 3A and 3B, which contrast the access results that a search engine will receive depending on the IP address or domain from which the search engine is accessing the originating domain referenced in the phishing email. Search engine 300 is not able to access the phishing site 200. When the computer request for access to the originating domain is received, the originating domain recognizes that the request is not coming from its target domain as in FIG. 3A. As a result the search engine 300 is not allowed to access phishing site 200, and instead is presented with access to decoy site 210. Hence it is the content on the decoy site 210 that is recognized and processed by the search engine, web crawlers, and others who were not targeted as opposed to the phishing site content.

Figure 4:
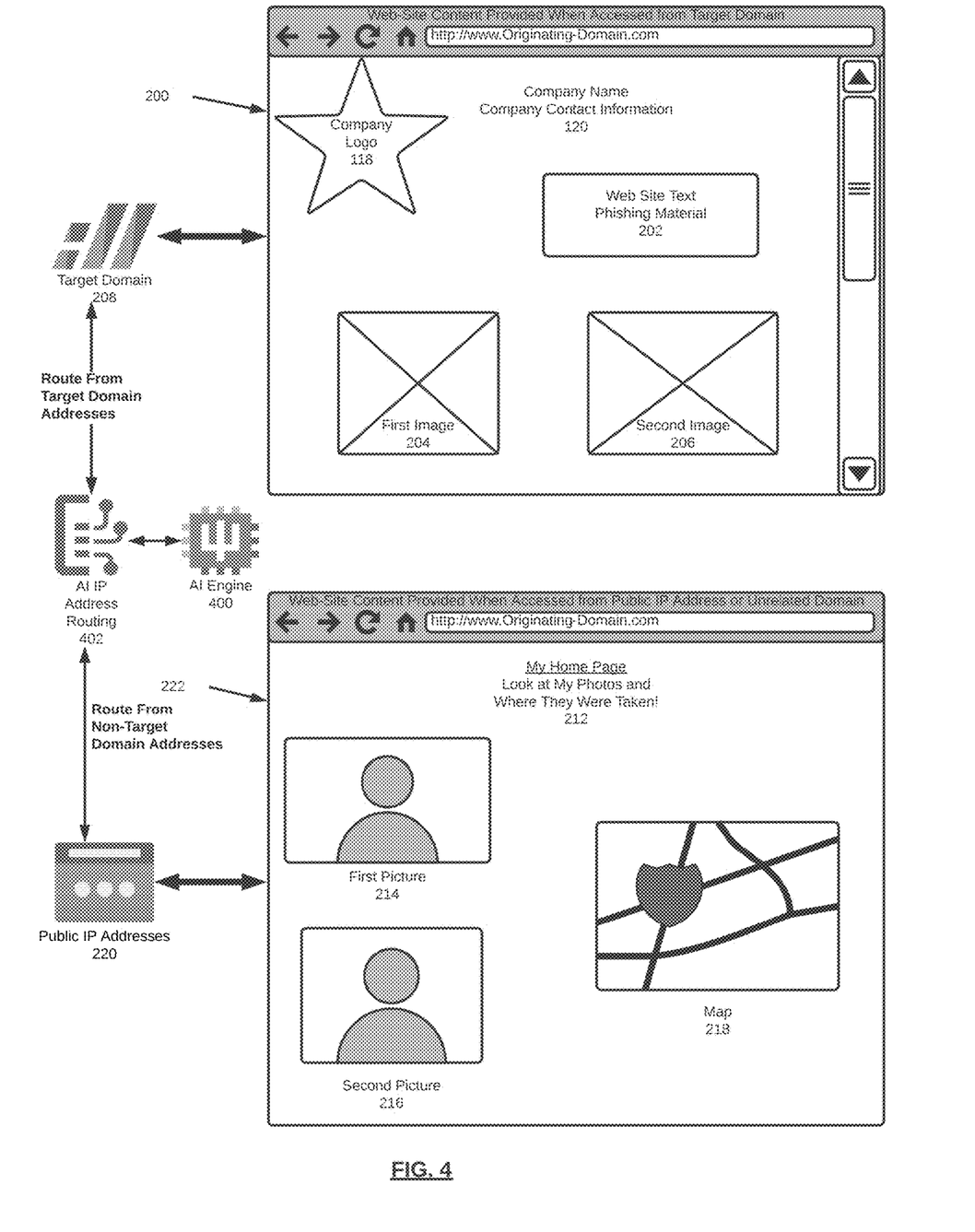
FIG. 4 illustrates an AI engine accessing the originating domain from both a target domain or target IP address range, and also accessing the originating domain from a public IP address or other domain outside the scope of what was targeted.

By way of non-limiting disclosure, FIG. 4 illustrates an AI engine that addresses these problems and accesses the originating domain from both a target domain or target IP address range, and also from a public IP address or other domain outside the scope of what was targeted. The AI engine 400 makes two requests. One is routed through or selected by an AI IP address routing component 402, which routes one request through a target domain 208 or applicable IP address. The other route is from a non-target domain 220 or applicable IP address. This simulates access from the targeted domain and conversely from a non-target domain (like from a search engine accessing the page to index it.) Both content and images from the phishing site 200 and the decoy site 222 are thus returned through the respective domains/IP addresses to the AI engine for image, content, metadata, etc. AI processing such as differential analysis, comparison, data mining, data and content extraction, scoring, etc. can then be performed. Again, a completely different page being presented depending on whether accessed from the targeted domain or a public IP address would be indicative of a potential phish risk.

Figure 5:
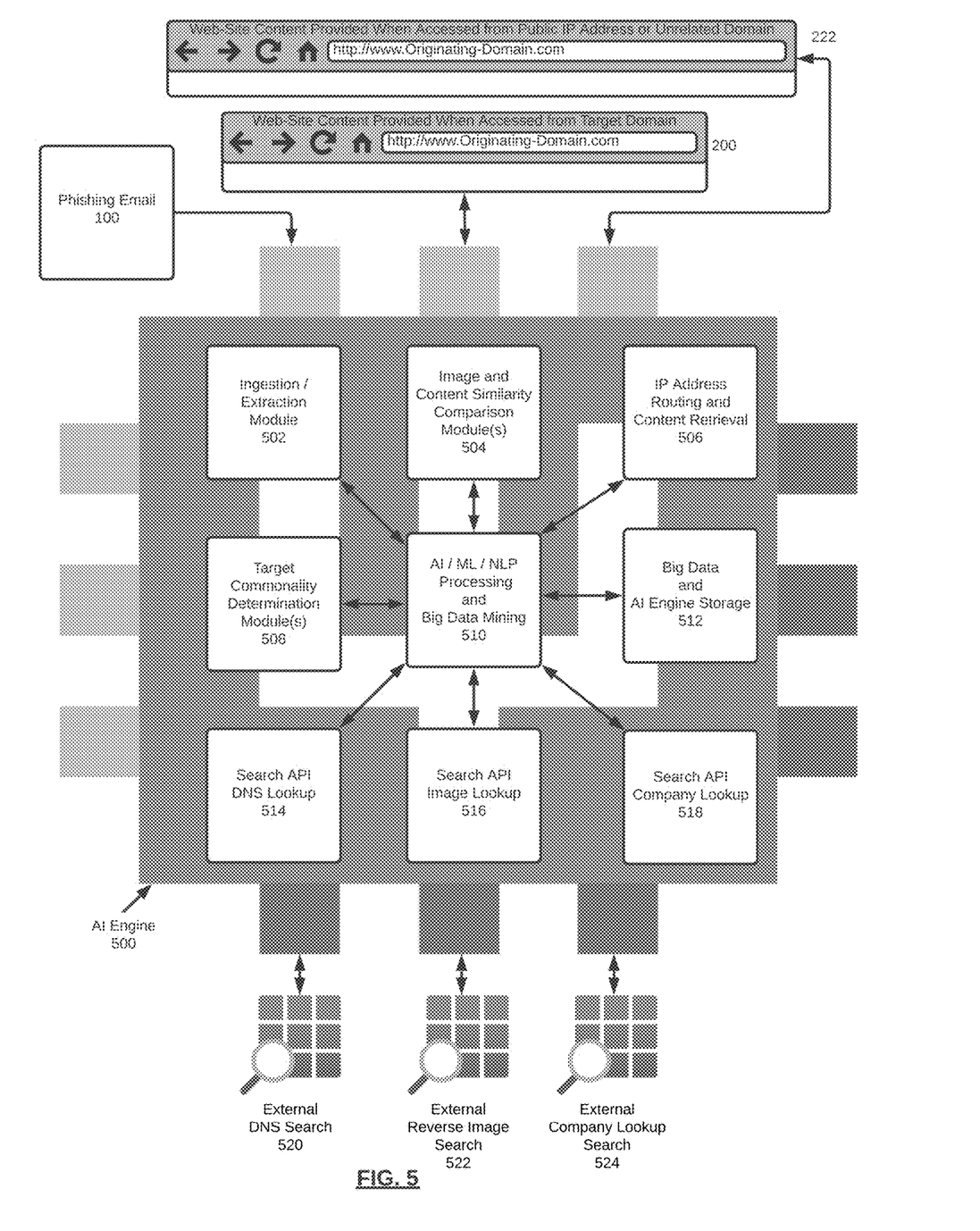
FIG. 5 illustrates sample interfaces, functions, and components for an AI engine in accordance with one or more anti-phishing information-security aspects of this disclosure.

By way of non-limiting disclosure, FIG. 5 illustrates sample interfaces, functions, and components for an AI engine 500 in accordance with one or more anti-phishing information-security aspects of this disclosure. Phishing email 100 as well as website content retrieved when accessed from a target domain/target IP address 200 or from a public IP address/unrelated domain 222 is ingested and information contained therein is extracted in ingestion/extraction module 502. Image and website content (including spellings and language usage) can be compared or differentiated in comparison module(s) 504. In internal 506, or external AI IP address routing component 506, can route requests to the originating domain and retrieve content via those IP address routes. AI processing (including commercially available artificial intelligence software, supervised/semi-supervised/unsupervised machine learning, natural language processing) and big data mining can be performed inside the AI engine 500 in component 510 which can be operatively coupled to the other modules and APIs in FIG. 5. Big data and AI engine data storage can also be provided internally 512 or externally (not shown) to house data results, compile historical information, enable AI engine learning and future processing, etc. Internal or external APIs 514, 516, 518 can interface with and trigger execution of external searches such as DNS search requests 520 to identify ownership of the originating domain, reverse lookups for images 522 referenced in the phishing email or appearing on the originating domain to identify ownership information and sites where the images have appeared, company name searches 524, etc.

Figure 6:
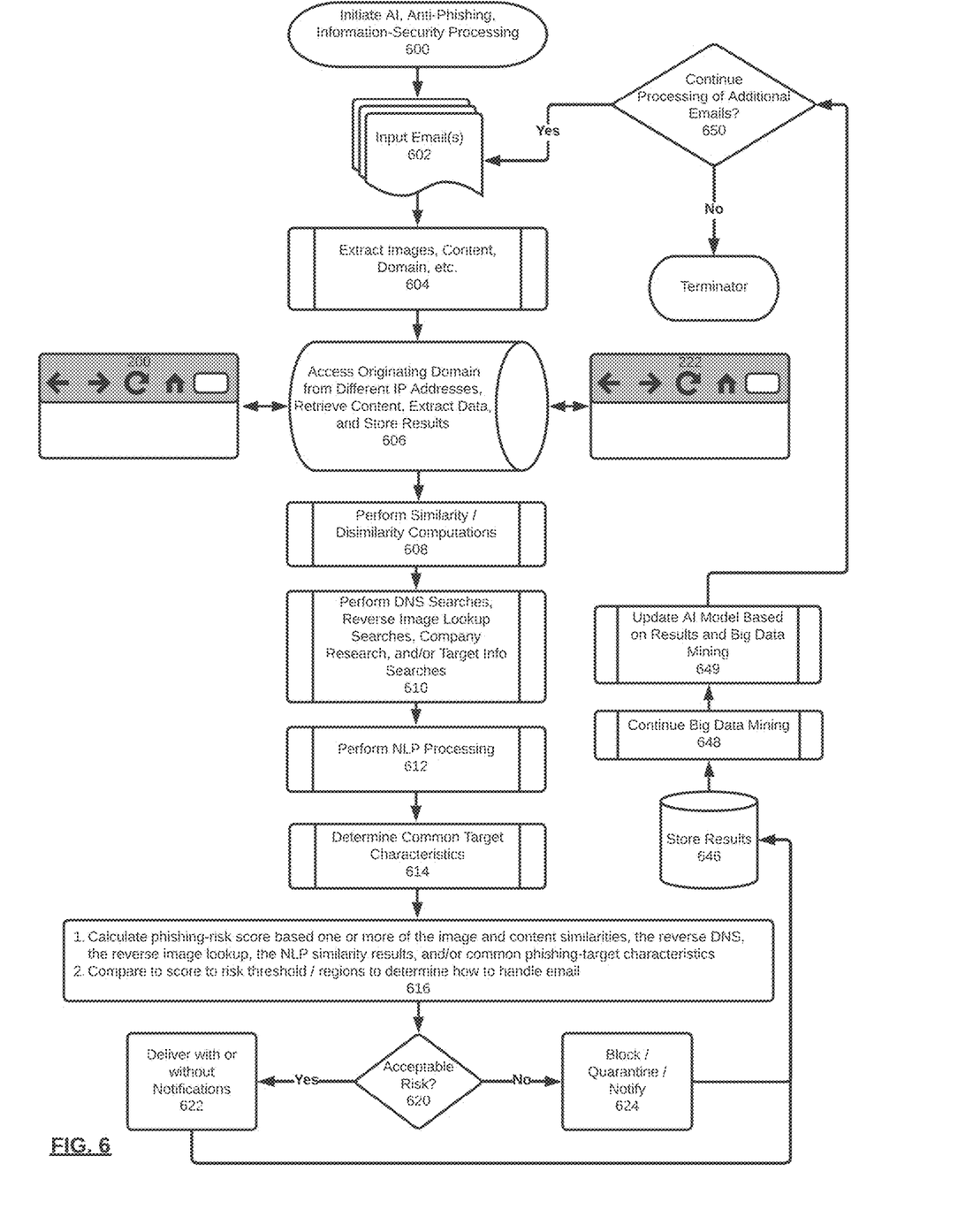
FIGS. 6, 7, and 8 illustrate sample functions, steps, and methods for implementing one or more anti-phishing information-security aspects of this disclosure.
Figure 7:
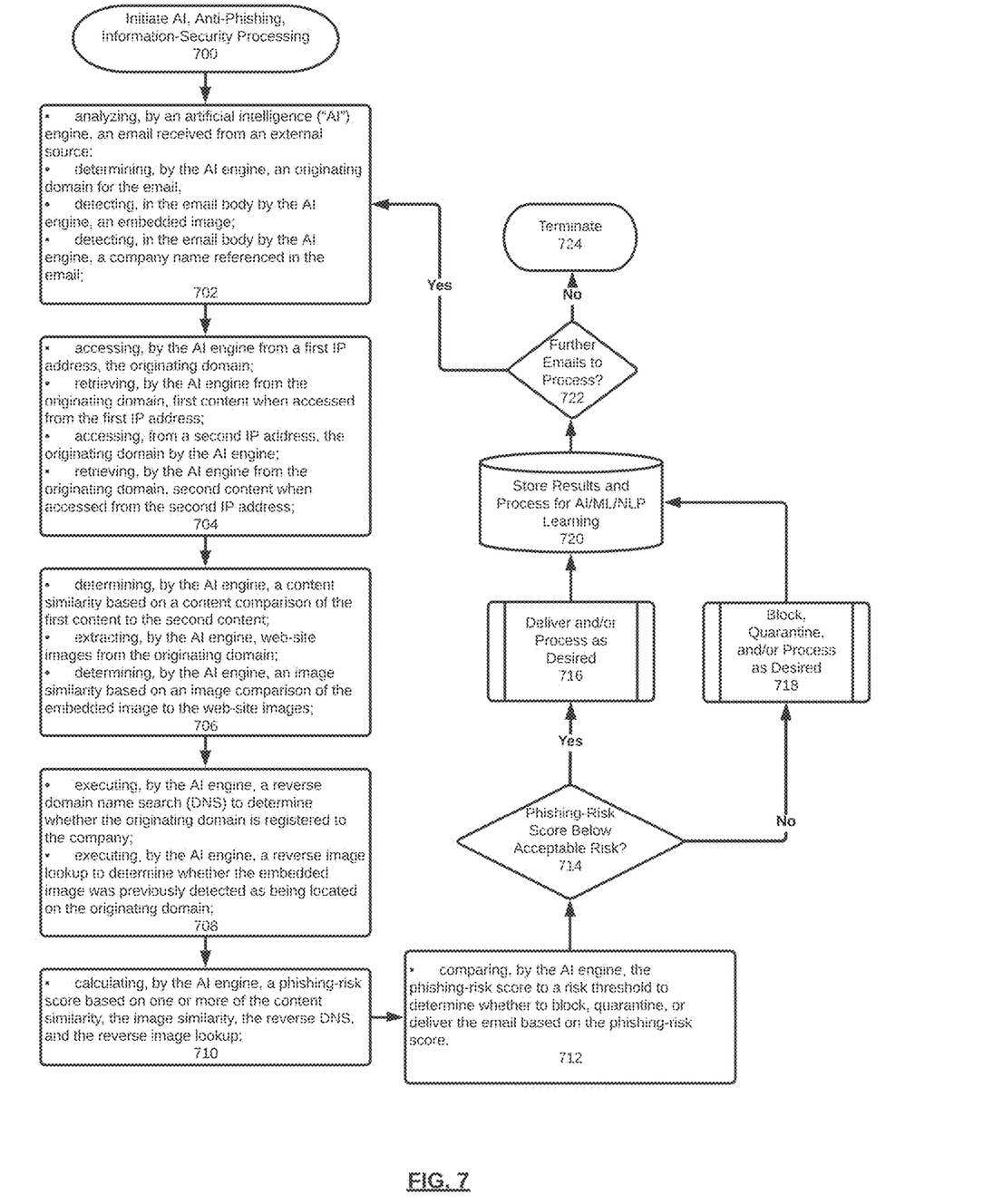
Figure 8:
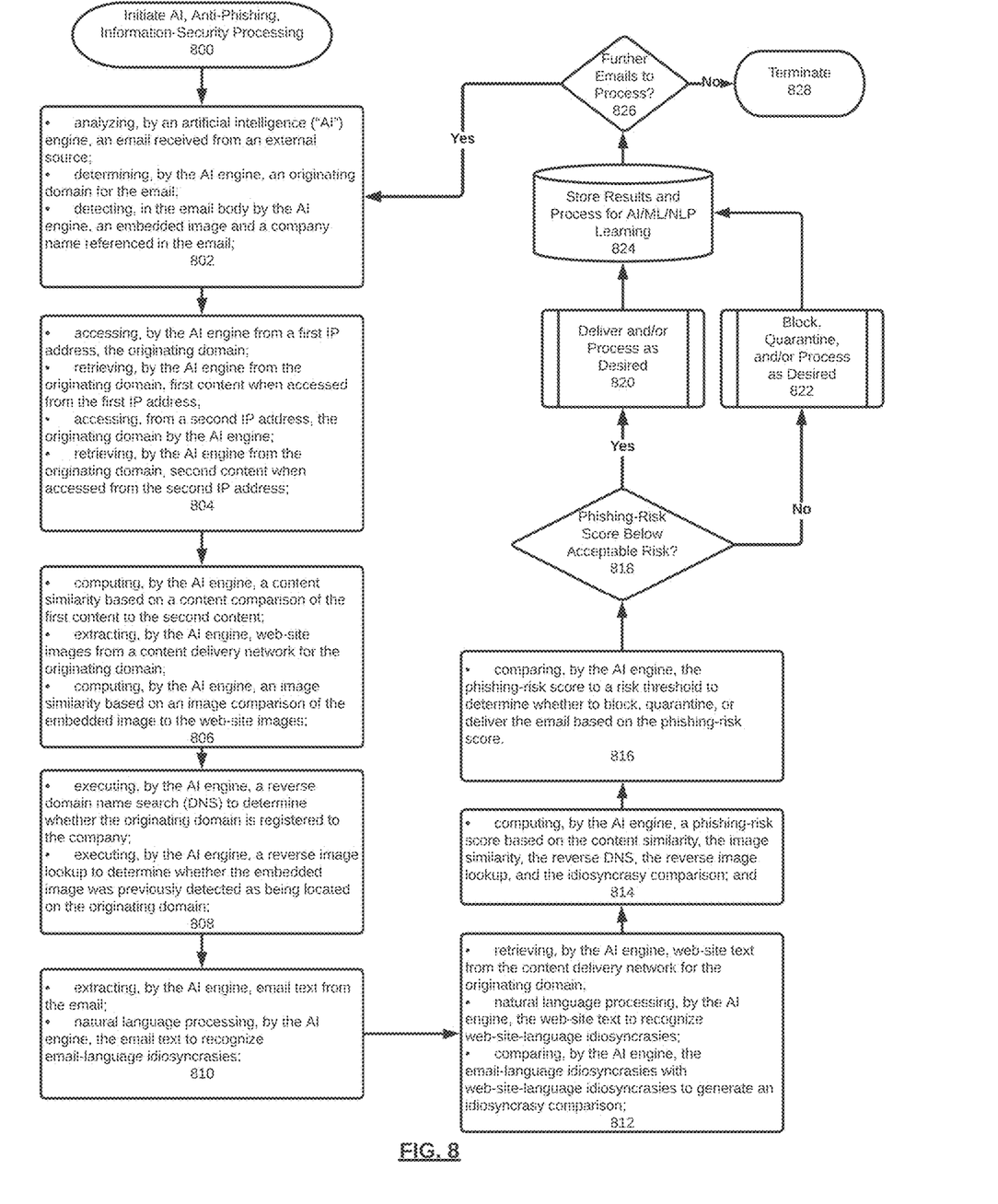

By way of non-limiting disclosure, FIGS. 6, 7, and 8 illustrate sample functions, steps, and methods for implementing one or more anti-phishing information-security aspects of this disclosure.

In FIG. 6, an AI, anti-phishing, information-security process is initiated at 600. Emails are input or ingested in 602. Images, website content, text, metadata, domain information, ownership information, and/or other data from the email 200 is extracted in 604. In 606, the originating domain is accessed from different IP addresses/domains, contents and data can be retrieved and extracted, results can be returned to the AI engine, and processed and stored. If desired, one or more similarity/dissimilarity computations can be performed on the images in the email and on the website, the other email/website metadata, the email/website text content, and anything else contained in the email or website in 608. If desired, in 610, one or more reverse DNS searches, reverse image lookup searches, and/or company research can be performed. Additionally and/or alternatively, and/or target information searches to identify information in common between other individuals who also received the email can also be performed. This could help determine why those particular individuals were targeted with the attack. In 612, natural language processing can be performed on the text in the email and the text on the webpage. This can identify idiosyncrasies such as regional word misspellings, etc. NLP is particularly helpful from an AI perspective since individuals typically speak in a certain way with their own idiosyncrasies. The same is true of companies because they typically brand their messages in certain ways with their own unique idiosyncrasies. These idiosyncrasies can be discerned from NLP based on data gathered by big data mining as well as determined by comparison of the email to the website and can be used by the AI engine.

In 616, a phishing-risk score can be computed or calculated based one or more of the image and content similarities, the reverse DNS, the reverse image lookup, the NLP similarity results, and/or common phishing-target characteristics. If, in both the email and on the websites, the more identical/consistent/similar, etc. that the images are, the text is, the language and other idiosyncrasies are, and if the reverse DNS and reverse image lookup searches do not turn up problems, and if there are no common target issues that arise, the more likely it is that the email is not a phishing email. So irrespective of how each component is mathematically weighted and utilized in the calculation, a determination can be made as to the overall probability that the email is a phishing email or is otherwise legitimate. The score may be calculated in any manner desired and, if desired, various score regions may range from highly likely to be a phishing email to unlikely to be a threat. Separate score regions (high risk, medium risk, low risk, etc.) may be utilized for comparison to the calculated score in order to determine how to handle the individual email.

If the email falls into an acceptable risk region/threshold 620, the email might be delivered 622 (with or without notifications relating to the AI analysis and with or without a sample calculated phish-risk score). Conversely, if the email falls outside an acceptable risk region/threshold 620, the email might be blocked, quarantined 624 (with or without notifications relating to the AI analysis and with or without a sample calculated phish-risk score). Results may be stored in 646. Additional big data mining may continue to be performed, if desired, either as a part of this process in 648 or externally and separately. The data on which the AI engine is based or on which it is operating can be updated with the particular searches and analyses referenced above and can also be added to the big data mining search results and historical data 649. The process may then continue for other emails to analyze 650.

In FIG. 7, another sample anti-phishing information-security method is disclosed. In 702, steps of analyzing, by an artificial intelligence ("AI") engine, an email received from an external source; determining, by the AI engine, an originating domain for the email; detecting, in the email body by the AI engine, an embedded image; and/or detecting, in the email body by the AI engine, a company name referenced in the email are performed.

Next, in 704, steps of accessing, by the AI engine from a first IP address, the originating domain; retrieving, by the AI engine from the originating domain, first content when accessed from the first IP address; accessing, from a second IP address, the originating domain by the AI engine; and/or retrieving, by the AI engine from the originating domain, second content when accessed from the second IP address are performed.

In 706, steps of determining, by the AI engine, a content similarity based on a content comparison of the first content to the second content; extracting, by the AI engine, website images from the originating domain; and/or determining, by the AI engine, an image similarity based on an image comparison of the embedded image to the website images are performed.

In 708, steps of executing, by the AI engine, a reverse domain name search (DNS) to determine whether the originating domain is registered to the company; and/or executing, by the AI engine, a reverse image lookup to determine whether the embedded image was previously detected as being located on the originating domain are performed.

Next, in 710 and 712, the steps of calculating, by the AI engine, a phishing-risk score based on one or more of the content similarity, the image similarity, the reverse DNS, and the reverse image lookup; and/or comparing, by the AI engine, the phishing-risk score to a risk threshold to determine whether to block, quarantine, or deliver the email based on the phishing-risk score are performed.

If the phishing-risk score is below an acceptable risk or in an unacceptable risk or risky region 714, the email can be blocked, quarantined, or otherwise suitably processed as desired in 718. Otherwise, it can be delivered and/or handled as desire in 716.

In 720, the results may be stored and processed for further or future AI/ML/NLP learning or big data mining. Additional emails may be processed if desired in 722 or the process can conclude in 724.

In FIG. 8, yet another sample anti-phishing information-security method is disclosed. In 802, steps of analyzing, by an artificial intelligence ("AI") engine, an email received from an external source; detecting, by the AI engine, that the email was sent to multiple individuals in an organization; comparing, by the AI engine, job information for each of said multiple recipients; and/or detecting, by the AI engine, any commonalities in the job information are performed.

In 804, steps of determining, by the AI engine, an originating domain for the email; detecting, in the email body by the AI engine, an embedded image and a company name referenced in the email; accessing, by the AI engine from a first IP address, the originating domain; retrieving, by the AI engine from the originating domain, first content when accessed from the first IP address; accessing, from a second IP address, the originating domain by the AI engine; and/or retrieving, by the AI engine from the originating domain, second content when accessed from the second IP address are performed.

In 806, steps of determining, by the AI engine, a content similarity based on a content comparison of the first content to the second content; extracting, by the AI engine, website images from the originating domain; and/or determining, by the AI engine, an image similarity based on an image comparison of the embedded image to the website images are performed.

Next, in 808, steps of executing, by the AI engine, a reverse domain name search (DNS) to determine whether the originating domain is registered to the company; and/or executing, by the AI engine, a reverse image lookup to determine whether the embedded image was previously detected as being located on the originating domain are performed.

In 810, steps of extracting, by the AI engine, email text from the email; and natural language processing, by the AI engine, the email text to recognize email-language idiosyncrasies are performed.

In 812, steps of retrieving, by the AI engine, website text from the originating domain; natural language processing, by the AI engine, the website text to recognize website-language idiosyncrasies; and/or comparing, by the AI engine, the email-language idiosyncrasies with website-language idiosyncrasies to generate an idiosyncrasy comparison are performed.

Next, in 814 and 816, the steps of calculating, by the AI engine, a phishing-risk score based on the content similarity, the image similarity, the reverse DNS, the reverse image lookup, the idiosyncrasy comparison, and the commonalities; and/or comparing, by the AI engine, the phishing-risk score to a risk threshold to determine whether to block, quarantine, or deliver the email based on the phishing-risk score are performed.

If the phishing-risk score is below an acceptable risk or in an unacceptable risk or risky region 818, the email can be blocked, quarantined, or otherwise suitably processed as desired in 822. Otherwise, it can be delivered and/or handled as desire in 820.

In 824, the results may be stored and processed for further or future AI/ML/NLP learning or big data mining. Additional emails may be processed if desired in 826 or the process can conclude in 828.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. An anti-phishing information-security method comprising the steps of:

analyzing, by an artificial intelligence ("AI") engine, an email received from an external source;

determining, by the AI engine, an originating domain for the email;

detecting, in the email body by the AI engine, an embedded image and a company name referenced in the email;

accessing, by the AI engine from a first IP address associated with a target domain of an organization receiving the email, the originating domain;

retrieving, by the AI engine from the originating domain, first content when accessed from the first IP address;

accessing, by the AI engine from a second IP address that is a public IP address unaffiliated with the target domain, the originating domain;

retrieving, by the AI engine from the originating domain, second content when accessed from the second IP address;

determining, by the AI engine, a content similarity based on a content comparison of the first content to the second content, wherein a discrepancy between the first content and the second content indicates a phishing attempt targeting the organization;

extracting, in real-time by the AI engine, website images directly from the originating domain;

determining, by the AI engine, an image similarity based on an image comparison of the embedded image to the website images extracted in real-time from the originating domain;

executing, by the AI engine, a reverse domain name search (DNS) to determine whether the originating domain is registered to the company referenced in the email;

executing, by the AI engine, a reverse image lookup to determine whether the embedded image was previously detected as being located on the originating domain;

extracting, by the AI engine, email text from the email;

performing natural language processing (NLP), by the AI engine, on the email text to recognize email-language idiosyncrasies, including regional language patterns and misspellings, and identifying language patterns and anomalies that may indicate phishing;

retrieving, by the AI engine, website text from the originating domain when accessed from the first IP address;

performing NLP, by the AI engine, on the website text to recognize website-language idiosyncrasies;

comparing, by the AI engine, the email-language idiosyncrasies with the website-language idiosyncrasies to generate an idiosyncrasy comparison indicating consistency or inconsistency with legitimate company messaging;

determining, by the AI engine, whether the email was sent to multiple recipients within the organization;

if the email was sent to multiple recipients:
  comparing, by the AI engine, job information for each of said multiple recipients, wherein the job information includes at least one of job titles, departments, or organizational roles;
  detecting, by the AI engine, any commonalities in the job information indicative of a targeted phishing attack against a specific group within the organization;
  calculating, by the AI engine, a phishing-risk score based on a weighted combination of the content similarity, the image similarity, the reverse DNS result, the reverse image lookup result, the idiosyncrasy comparison, and, if applicable, the commonalities in job information, wherein each factor is assigned a distinct weight based on its relevance to phishing detection; and
  comparing, by the AI engine, the phishing-risk score to a risk threshold to determine whether to block, quarantine, or deliver the email, wherein the risk threshold is adjustable based on the organization's security policies;
if the phishing-risk score exceeds the risk threshold, blocking or quarantining the email and providing a notification including the phishing-risk score;
if the phishing-risk score does not exceed the risk threshold, delivering the email, optionally with a notification including the phishing-risk score;
providing notifications to the user including the phishing-risk score and risk categories;
storing the email analysis results, including the phishing-risk score and the determination, in a database;
using the stored results to train the AI engine, via machine learning, to optimize the calculation of the phishing-risk score for future emails; and
performing big data mining on historical email data to identify patterns and idiosyncrasies associated with phishing emails from particular regions or actors, and incorporating this information into the AI engine's analysis.

2. The method of claim 1, wherein the AI engine is hosted in a cloud environment.

3. The method of claim 2, wherein the website images are retrieved from a content delivery network associated with the originating domain.

4. The method of claim 3, further comprising: categorizing the phishing-risk score into risk categories, such as high risk, medium risk, or low risk, based on predefined score ranges.

5. The method of claim 4, wherein the notifications include the phishing-risk score and the risk category.

6. The method of claim 5, further comprising:
receiving user feedback on the accuracy of the phishing-risk score; and
using the user feedback to further train the AI engine.

7. The method of claim 6, wherein the big data mining identifies regional language patterns and common misspellings associated with phishing emails from specific geographic regions.

8. The method of claim 7, further comprising: dynamically updating, by the AI engine, the phishing-risk score calculation in real-time based on ongoing monitoring of emails received by the organization.

9. The method of claim 8, further comprising: generating, by the AI engine, a report summarizing the phishing-risk scores and handling decisions for a plurality of emails over a specified period.

10. The method of claim 9, wherein the steps are implemented as computer-executable instructions stored on a non-transitory computer-readable medium and executed by a processor.

11. An anti-phishing information-security method comprising the steps of:
analyzing, by an artificial intelligence ("AI") engine hosted in a cloud environment, an email received from an external source;
determining, by the AI engine, an originating domain for the email;
detecting, in the email body by the AI engine, an embedded image and a company name referenced in the email;
accessing, by the AI engine from a first IP address associated with a target domain of an organization receiving the email, the originating domain;
retrieving, by the AI engine from the originating domain, first content when accessed from the first IP address;
accessing, by the AI engine from a second IP address that is a public IP address unaffiliated with the target domain, the originating domain;
retrieving, by the AI engine from the originating domain, second content when accessed from the second IP address;
determining, by the AI engine, a content similarity based on a content comparison of the first content to the second content, wherein a discrepancy between the first content and the second content indicates a phishing attempt targeting the organization;
extracting, in real-time by the AI engine, website images directly from a content delivery network associated with the originating domain;
determining, by the AI engine, an image similarity based on an image comparison of the embedded image to the website images extracted in real-time;
executing, by the AI engine, a reverse domain name search (DNS) to determine whether the originating domain is registered to the company referenced in the email;
executing, by the AI engine, a reverse image lookup to determine whether the embedded image was previously detected as being located on the originating domain;
extracting, by the AI engine, email text from the email;
performing natural language processing (NLP), by the AI engine, on the email text to recognize email-language idiosyncrasies, including regional language patterns and misspellings, and identifying language patterns and anomalies that may indicate phishing;
retrieving, by the AI engine, website text from the originating domain when accessed from the first IP address;
performing NLP, by the AI engine, on the website text to recognize website-language idiosyncrasies;
comparing, by the AI engine, the email-language idiosyncrasies with the website-language idiosyncrasies to generate an idiosyncrasy comparison indicating consistency or inconsistency with legitimate company messaging;
determining, by the AI engine, whether the email was sent to multiple recipients within the organization;
if the email was sent to multiple recipients:
  comparing, by the AI engine, job information for each of said multiple recipients, wherein the job information includes at least one of job titles, departments, or organizational roles;

detecting, by the AI engine, any commonalities in the job information indicative of a targeted phishing attack against a specific group within the organization;

performing, by the AI engine, a domain search on the company name to identify legitimate IP addresses associated with the company;

comparing, by the AI engine, the originating domain's IP address to the legitimate IP addresses to determine if there is a match or mismatch;

calculating, by the AI engine, a phishing-risk score based on a weighted combination of the content similarity, the image similarity, the reverse DNS result, the reverse image lookup result, the idiosyncrasy comparison, the match or mismatch of IP addresses, and, if applicable, the commonalities in job information, wherein each factor is assigned a distinct weight based on its relevance to phishing detection; and comparing, by the AI engine, the phishing-risk score to a risk threshold to determine whether to block, quarantine, or deliver the email, wherein the risk threshold is adjustable based on the organization's security policies;

if the phishing-risk score exceeds the risk threshold, blocking or quarantining the email and providing a notification including the phishing-risk score and the risk category;

if the phishing-risk score does not exceed the risk threshold, delivering the email, optionally with a notification including the phishing-risk score and the risk category;

providing notifications to the user including the phishing-risk score and risk categories;

storing the email analysis results, including the phishing-risk score and the determination, in a database;

using the stored results to train the AI engine, via machine learning, to optimize the calculation of the phishing-risk score for future emails;

performing big data mining on historical email data to identify patterns and idiosyncrasies associated with phishing emails from particular regions or actors, including regional language patterns and common misspellings, and incorporating this information into the AI engine's analysis;

dynamically updating, by the AI engine, the phishing-risk score calculation in real-time based on ongoing monitoring of emails received by the organization;

generating, by the AI engine, a report summarizing the phishing-risk scores and handling decisions for a plurality of emails over a specified period; and training the AI engine using a dataset of labeled emails, where each email is labeled as phishing or legitimate, to improve the accuracy of the phishing-risk score calculation.

12. A system for anti-phishing information security, comprising:
a processor; and
a memory storing computer-executable instructions, that when executed by the processor, implements an artificial intelligence ("AI") engine, the artificial intelligence ("AI") engine configured to:
analyze an email received from an external source;
determine an originating domain for the email;
detect, in the email body, an embedded image and a company name referenced in the email;
access, from a first IP address associated with a target domain of an organization receiving the email, the originating domain;
retrieve, from the originating domain, first content when accessed from the first IP address;
access, from a second IP address that is a public IP address unaffiliated with the target domain, the originating domain;
retrieve, from the originating domain, second content when accessed from the second IP address;
determine a content similarity based on a content comparison of the first content to the second content, wherein a discrepancy indicates a phishing attempt;
extract, in real-time, website images directly from the originating domain;
determine an image similarity based on an image comparison of the embedded image to the website images;
execute a reverse domain name search (DNS) to determine whether the originating domain is registered to the company;
execute a reverse image lookup to determine whether the embedded image was previously detected on the originating domain;
extract email text from the email;
perform natural language processing (NLP) on the email text to recognize email-language idiosyncrasies;
retrieve website text from the originating domain when accessed from the first IP address;
perform NLP on the website text to recognize website-language idiosyncrasies;
compare the email-language idiosyncrasies with the website-language idiosyncrasies to generate an idiosyncrasy comparison;
determine whether the email was sent to multiple recipients within the organization;
when the email was sent to multiple recipients, compare job information for each recipient and detect commonalities indicative of a targeted phishing attack;
calculate a phishing-risk score based on a weighted combination of the content similarity, image similarity, reverse DNS result, reverse image lookup result, idiosyncrasy comparison, and, if applicable, commonalities in job information;
compare the phishing-risk score to a risk threshold to determine whether to block, quarantine, or deliver the email;
if the score exceeds the threshold, block or quarantine the email and provide a notification;
if the score does not exceed the threshold, deliver the email, optionally with a notification;
provide notifications including the score and risk categories;
store analysis results in a database;
use stored analysis results to train the AI engine via machine learning;
perform big data mining on historical email data to identify phishing patterns.

13. The system of claim 12, further comprising a cloud environment hosting the AI engine.

14. The system of claim 13, wherein the AI engine is configured to retrieve the website images from a content delivery network associated with the originating domain.

15. The system of claim 14, wherein the AI engine is further configured to categorize the phishing-risk score into risk categories based on predefined score ranges.

16. The system of claim 15, wherein the AI engine is further configured to:
   receive user feedback on the accuracy of the phishing-risk score; and
   use the user feedback to further train the AI engine.

17. The system of claim 16, wherein the big data mining identifies regional language patterns and common misspellings associated with phishing emails from specific geographic regions.

18. The system of claim 17, wherein the AI engine is further configured to dynamically update the phishing-risk score calculation in real-time based on ongoing monitoring of emails.

19. The system of claim 18, wherein the AI engine is further configured to generate a report summarizing the phishing-risk scores and handling decisions for a plurality of emails over a specified period.

20. The system of claim 19, wherein the memory further comprises computer-executable instructions executed by the processor to implement:
   a user interface configured to allow a user to adjust the risk threshold based on the organization's security policies and to view the generated reports; and
   an integration module configured to integrate the system with other security systems within the organization to share phishing-risk information and enhance overall security posture.

* * * * *